United States Patent
Chen et al.

(10) Patent No.: US 6,780,048 B2
(45) Date of Patent: Aug. 24, 2004

(54) POWER-SUPPLYING DEVICE FOR PERIPHERAL APPLIED EQUIPMENTS OF A COMPUTER

(76) Inventors: Chia Yuan Chen, 5Fl., No. 14, Mingyuan St., Sanchung City, Taipei (TW); Rick Liao, No. 37, Alley 7, Lane 87, Fude St., Yangmei Jen, Taoyuan (TW)

( * ) Notice: Subject to any disclaimer, the term of this patent is extended or adjusted under 35 U.S.C. 154(b) by 0 days.

(21) Appl. No.: 10/350,122

(22) Filed: Jan. 24, 2003

(65) Prior Publication Data

US 2004/0147162 A1 Jul. 29, 2004

(51) Int. Cl.$^7$ ............................................. H01R 11/00
(52) U.S. Cl. ...................................................... 439/502
(58) Field of Search ................................ 439/502, 501, 439/188, 650, 214, 189; 307/38, 31, 150; 361/119

(56) References Cited

U.S. PATENT DOCUMENTS

| | | | | |
|---|---|---|---|---|
| 4,867,701 A | * | 9/1989 | Wiand | 439/501 |
| 5,579,201 A | * | 11/1996 | Karageozian | 361/119 |
| 5,658,158 A | * | 8/1997 | Milan | 439/214 |
| 5,904,591 A | * | 5/1999 | Shiau | 439/502 |
| 6,045,399 A | * | 4/2000 | Yu | 439/502 |
| 6,443,772 B1 | * | 9/2002 | Chen | 439/652 |
| 6,454,584 B1 | * | 9/2002 | Milan | 439/214 |
| 6,509,655 B1 | * | 1/2003 | Wang | 307/31 |
| 6,571,488 B2 | * | 6/2003 | Lin et al. | 34/58 |
| 6,586,849 B2 | * | 7/2003 | Tarr | 307/38 |

* cited by examiner

Primary Examiner—Tulsidas C. Patel
(74) Attorney, Agent, or Firm—Dennison, Schultz, Dougherty & MacDonald

(57) ABSTRACT

A power-supplying device includes: a housing of which one end has an electrically connecting end to connect a power source, the housing has at least a power supplying jack for connecting; a jack for a universal serial bus (USB) provided on the housing for connecting an inserted electric wire with a USB port of the computer; a control circuit provided in the housing and having an electronic switch to connect between the electrically connecting end and the power supplying jack, one end thereof is connected to the jack for the USB to detect the voltage of power source of the USB; and a manual switch provided on the housing, two end connecting points thereof are parallelly connected with the control circuit. Thereby, the power supplying structure can detect the voltage of power source of the USB to judge whether the computer is turned on and to render the actions of power supplying to go simultaneously. By switching of the manual switch, the electrically connecting end and the power supplying jack can be mutually connected directly in a way of short circuit to make the structure used only as an ordinary power supply socket.

10 Claims, 6 Drawing Sheets

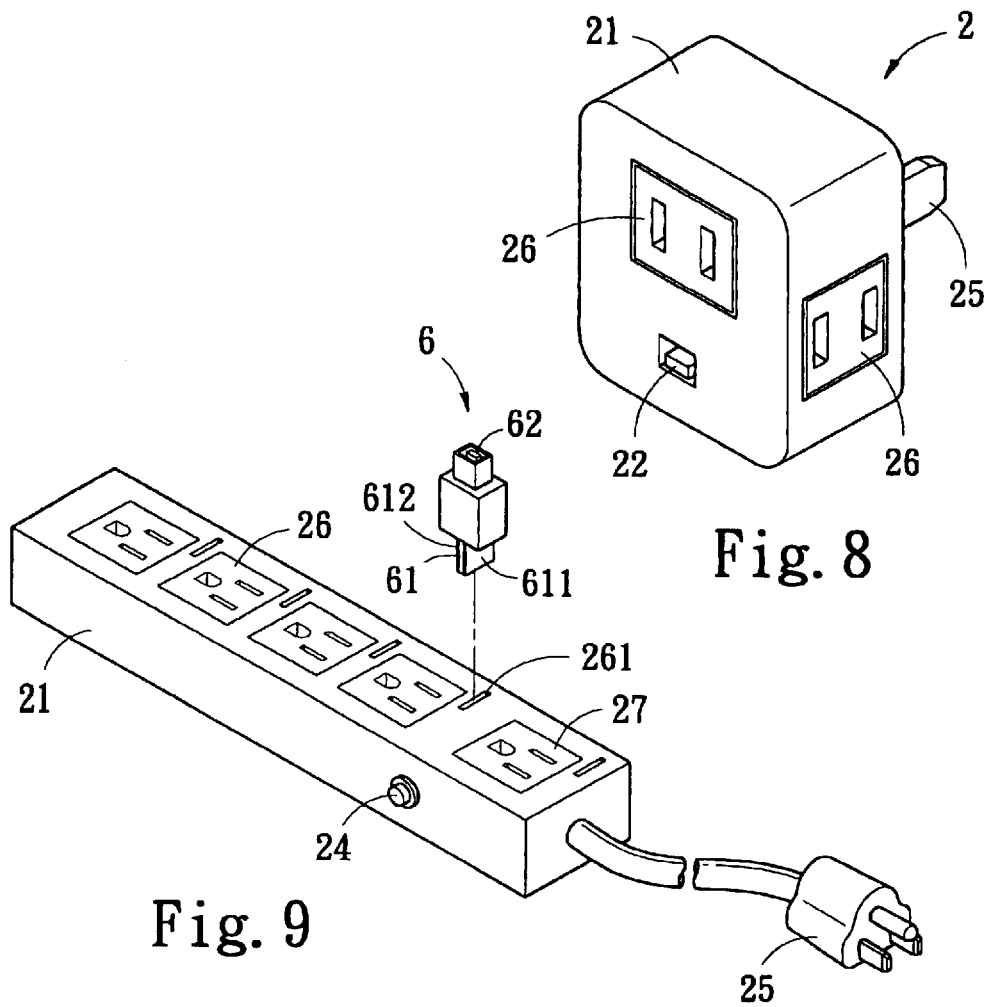
Fig. 8
Fig. 9
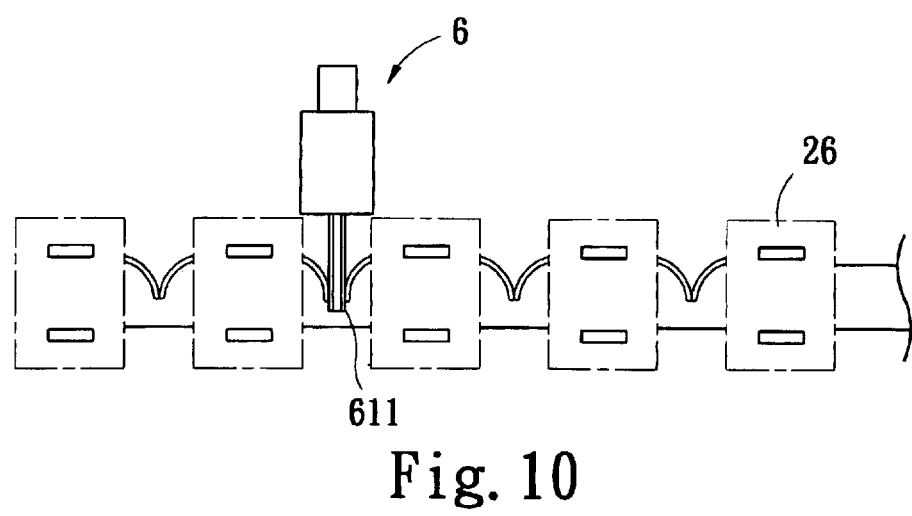
Fig. 10

POWER-SUPPLYING DEVICE FOR PERIPHERAL APPLIED EQUIPMENTS OF A COMPUTER

BACKGROUND OF THE INVENTION

1. Field of the Invention

The present invention is related to a power-supplying device for peripheral applied equipments of a computer, and especially to a power-supplying device detecting whether the computer terminal is turned on in pursuance of whether there is a voltage in the power source transmitted through a universal serial bus (USB) of a computer to simultaneously turn on/off the power sources for the peripheral applied equipments in connection with the computer and in the power source of the computer. The present invention is suitable for applying as a power-supplying device for an extension line or a socket.

2. Description of the Prior Art

In our information and digital era, people have been more and more relying upon computers for dealing with works and affairs of daily lives; thereby, computers become indispensable scientific and technologic necessitates. Following advancing of science and technology as well as increasing of requirements of customers, number of various peripheral applied equipments of computers can be hundreds; besides, by increasing of the level and requirement of consuming, some computer peripheral equipments such as printers, scanners, digital cameras etc, have been basic equipments for selection in purchasing a computer, together with the originally provided and externally connected peripheral equipments such as speakers, modems etc., they have made power supplying very complicated.

As shown in FIG. 1 which depicts a conventional power supply socket 1, the socket 1 has a plurality of jacks 11 for insertion connecting of some computer peripheral equipments, but it has the following defects:

1. When the power supply is to be turned off, the computer peripheral equipments have to be turned off individually; therefore, the more the computer peripheral equipments are, the more cumbersomeness the operation of them will have.
2. When in turning off the computer, a user often forgets to turn off the computer peripheral equipments; this makes waste of energy and money, and relatively, the danger of a conflagration will be induced.

In addition to this, another kind of conventional power supply sockets (not shown) each has two kinds of (male and female) insertion connecting ends, when in connecting relatively many computer peripheral equipments, a plurality of such kind of power supply sockets have to be used to get the object of serially connecting them; and other plugs have to be removed for mounting the power supply sockets. Thereby, mounting and removing are quite cumbersome.

In view of the above statement, the present invention is provided to get rid of the above stated defects of the conventional power supply sockets.

SUMMARY OF THE INVENTION

The primary object of the present invention is to provide a power-supplying device for peripheral applied equipments of a computer able to effectively save energy and money.

The secondary object of the present invention is to provide a two-usage power-supplying device for peripheral applied equipments of a computer, the device includes a household electric socket and a jack for a universal serial bus (USB).

To get the above objects of the present invention, the power-supplying device for peripheral applied equipments of a computer provided in the present invention includes: a housing of which one end is provided with an electrically connecting end to connect a power source, the housing has at least a power supplying jack for connecting; a jack for a universal serial bus (USB) provided on the housing for connecting an inserted electric wire with a universal serial bus (USB) port of the computer, a control circuit provided in the housing and being provided with an electronic switch to connect between the electrically connecting end and the power supplying jack, a detecting end thereof is connected to the jack for the universal serial bus (USB) to detect the voltage of power source of the USB, and to drive the electronic switch in a mode of connecting in a separated way; and a manual switch provided on the housing, two end connecting points of the manual switch are parallelly connected with the control circuit.

Thereby, the structure for power supplying can detect the voltage of power source of the USB at the computer terminal to judge whether the computer is turned on and to render the actions of power supplying to go simultaneously. And by switching of the manual switch, the electrically connecting end and the power supplying jack can be directly connected with each other by operation of the manual switch in a way of short circuit to make the structure used only as an ordinary power supply socket The present invention will be apparent after reading the detailed description of the preferred embodiment thereof in reference to the accompanying drawings.

BRIEF DESCRIPTION OF THE DRAWINGS

FIG. 8 is a perspective view showing the appearance of the present invention in the form of a cubic structure;

FIG. 9 is a perspective view showing the appearance of another embodiment of the present invention;

FIG. 10 is a schematic view showing use of the embodiment of the present invention as shown in FIG. 9;

DETAILED DESCRIPTION OF THE PREFERRED EMBODIMENT

Figure 1:
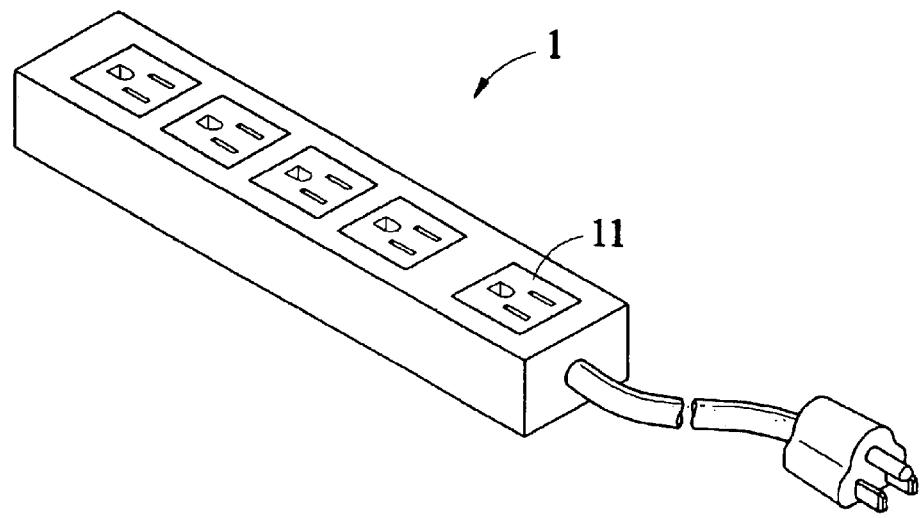
FIG. 1 is a perspective view showing the appearance of a conventional power supply socket.
Figure 2:
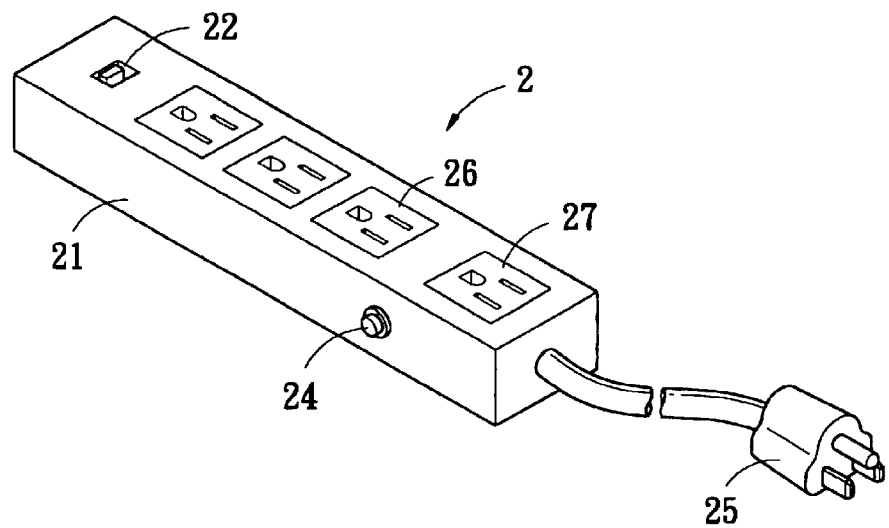
FIG. 2 is a perspective view showing an embodiment of the power-supplying device of the present invention for peripheral applied equipments of a computer.
Figure 3:
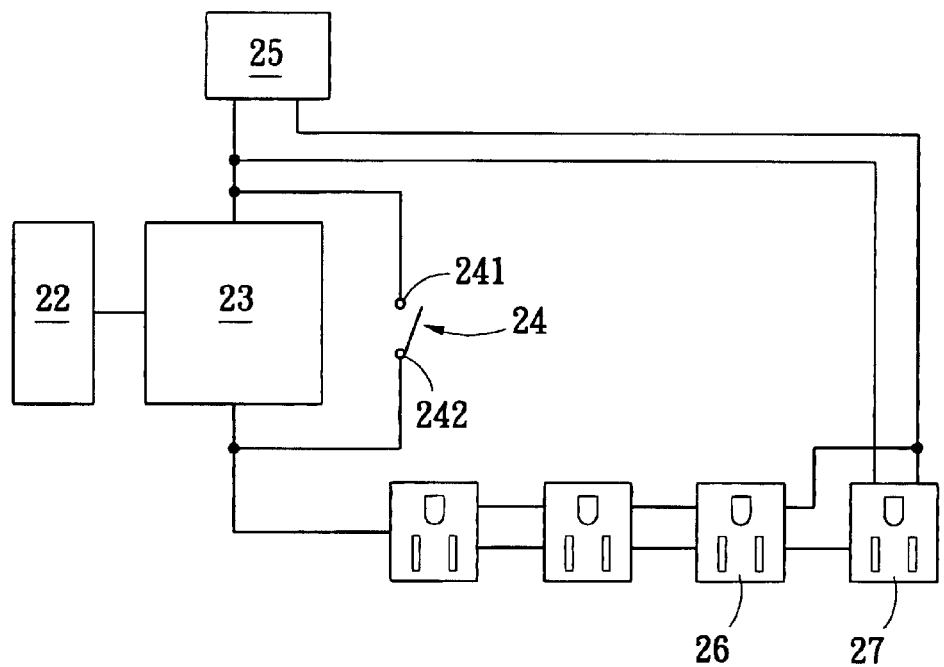
FIG. 3 is a block diagram of an electric circuit in the power-supplying device of the present invention for peripheral applied equipments of the computer.
Figure 4:
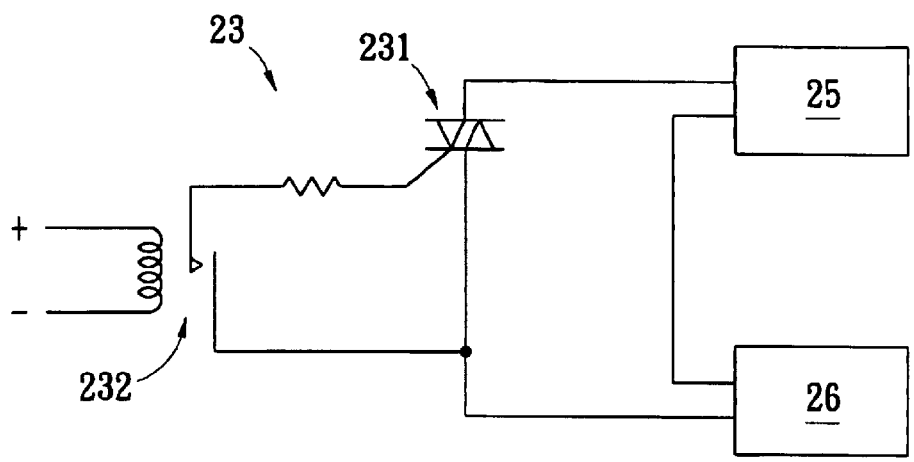
FIG. 4 is an internal circuit diagram of a control circuit of the present invention.

Referring to FIGS. 2–4 depicting an embodiment of a power-supplying device 2 of the present invention for peripheral applied equipments of a computer, the power-supplying device 2 is comprised of a housing 21, a jack 22 for a universal serial bus (USB), a control circuit 23 and a manual switch 24.

Wherein the housing 21 is provided on one end thereof with an electrically connecting end 25 which is an electric wire having a plug to connect a power source, the housing 21 has at least a power supplying jack 26.

Figure 7:
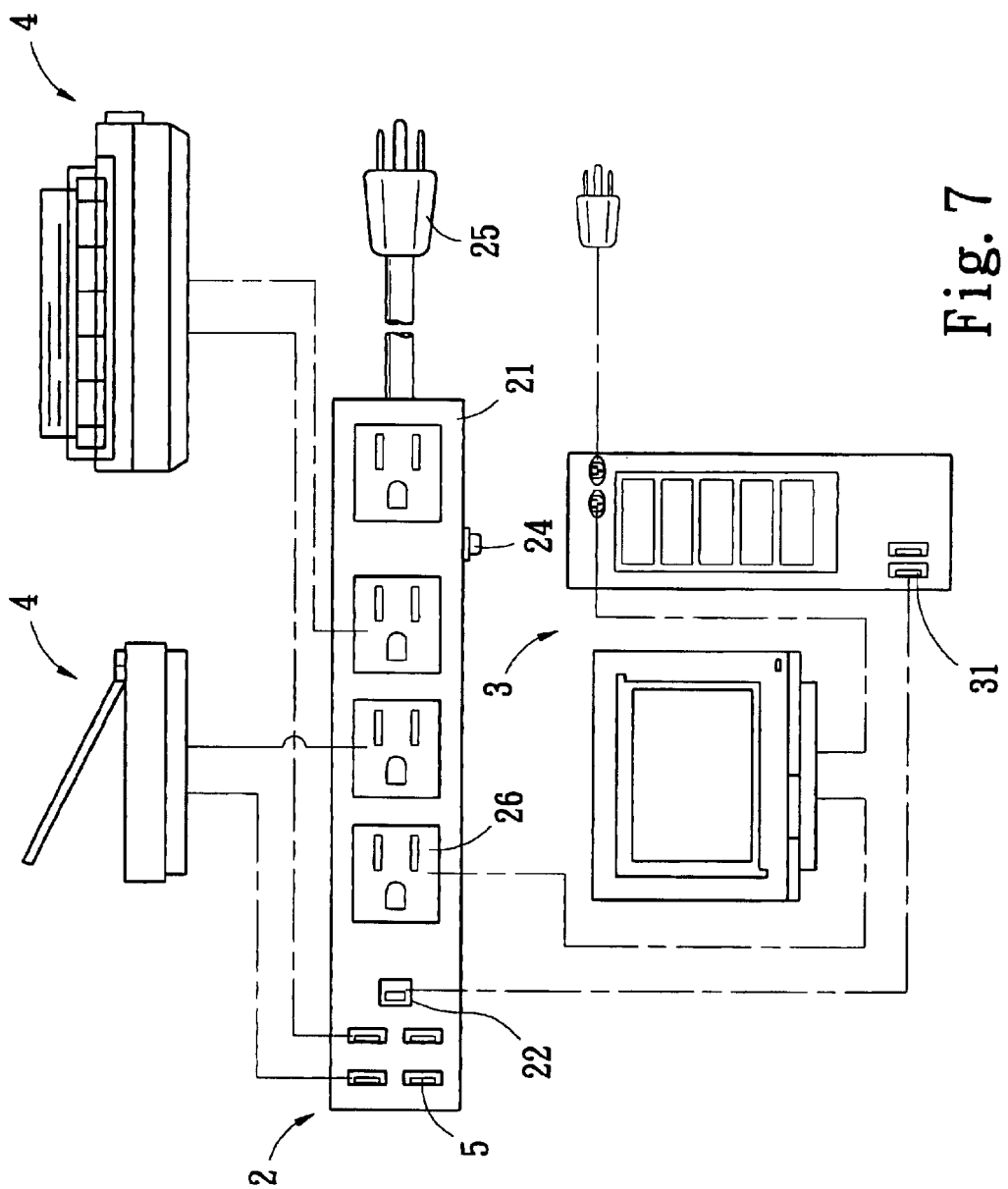
FIG. 7 is a perspective schematic view showing use of the present invention with a computer and the peripheral applied equipments of the computer.

The jack 22 for the universal serial bus (USB) is provided on the housing 21 for connecting an inserted electric wire with a universal serial bus (USB) port 31 of a computer 3 (referring to FIG. 7).

The control circuit 23 is provided in the housing 21 and is provided with an electronic switch 231 (such as a two-way silicon controlled rectifier) to connect between the electrically connecting end 25 and the power supplying jack 26, a detecting end thereof is connected to the jack 22 for the universal serial bus (USB) to detect the voltage of power source of the USB, and to drive the electronic switch 231 in a mode of connecting in a separated way.

And the manual switch 24 is provided on the housing 21, two end connecting points 241, 242 of the manual switch 24 are parallelly connected with the control circuit 23.

Thereby, the power-supplying device 2 for peripheral applied equipments of the computer 3 can detect the signals of the voltage of power source of the USB port 31 on the computer 3 to judge whether the computer 3 is turned on and to render the actions of power supplying to go simultaneously. And by switching of the manual switch as to the structure of the power-supplying device 2, the electrically connecting end 25 and the power supplying jack 26 can be directly connected with each other by operating the manual switch 24 in a way of short circuit to make the power-supplying device 2 used only as an ordinary power supply socket.

When in practicing, the control circuit 23 can be composed of an electronic switch 231 such as a two-way silicon controlled rectifier (TRIAC) and a relay 232 connecting with a gate of the TRIAC and the jack 22 for the universal serial bus (USB); and can also be a single solid relay (SSR). The entire power-supplying device 2 for peripheral applied equipments of the computer 3 can also be provided at least with a power supplying jack 27 completely not controlled by the computer 3 but capable of direct electrically insertion connecting for use; and even the entire hosing 21 can be in the form of a cube, and the electrically connecting end 25 is a plug directly formed on the rear side of the housing 21 (as shown in FIG. 8).

When in applying, as shown in FIG. 7, a plug of a peripheral applied equipment 4 of the computer 3 is insertion connected with the power supplying jack 26 of the power-supplying device 2; then the jack 22 for the universal serial bus (USB) is connected with an insertion wire to the USB port 31 of the computer 3; and finally, the electrically connecting end 25 on one end of the housing 21 and having a plug wire is connected with the power source. When the computer 3 is turned on, the voltage of power supply sent out from the USB port 31 of an interface of the computer 3 is detected by the control circuit 23 to turn on the electronic switch 231 for operation to simultaneously activate the power sources for the peripheral applied equipments 4. In the same way, when the computer 3 is turned off, the voltage of power supply of the USB port 31 of the interface of the computer 3 received by the control circuit 23 disappears, so that the electronic switch 231 renders the switches of the power sources for the peripheral applied equipments 4 to stop supplying electricity, this can eliminate the defect that the conventional structures shall turn off the peripheral applied equipments 4 one by one after turning off the computer 3.

The housing 21 of the present invention is provided with the manual switch 24 (as shown in FIG. 3), the two end connecting points 241, 242 of the manual switch 24 are parallelly connected with the control circuit 23; so that when the manual switch 24 forms an open circuit, the present invention can have the above stated functions; while if the manual switch 24 is in the mode of short circuit, the electrically connecting end 25 and the power supplying jack 26 can be connected with each other to be used only as an ordinary power supply socket. Thereby, the power-supplying device 2 has two functions.

Figure 5:
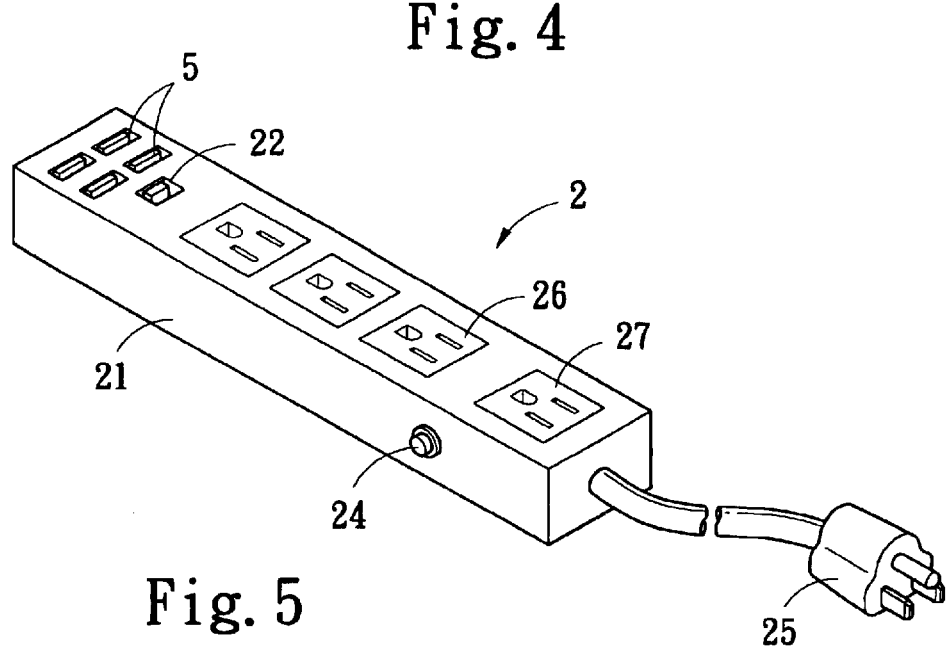
FIG. 5 is a perspective view showing the appearance of the housing with a plurality of universal serial bus hubs combined therein.
Figure 6:
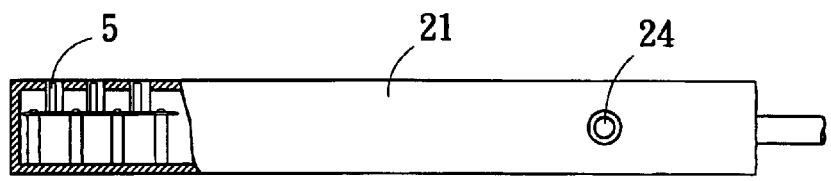
FIG. 6 is a partial sectional view taken from FIG. 5.

Additionally, as shown in FIGS. 5 and 6, by virtue that the present invention is provided with a jack 22 for the universal serial bus (USB), the housing 21 can be additionally mounted therein with a plurality of universal serial bus hubs 5, thereby, the power source and the driving connecting lines of the related peripheral applied equipments 4 can be simultaneously insertion connected to the housing 21 in order that all the peripheral applied equipments 4 can be more convenient in insertion connecting without separated inserting into two different sockets.

Figure 11:
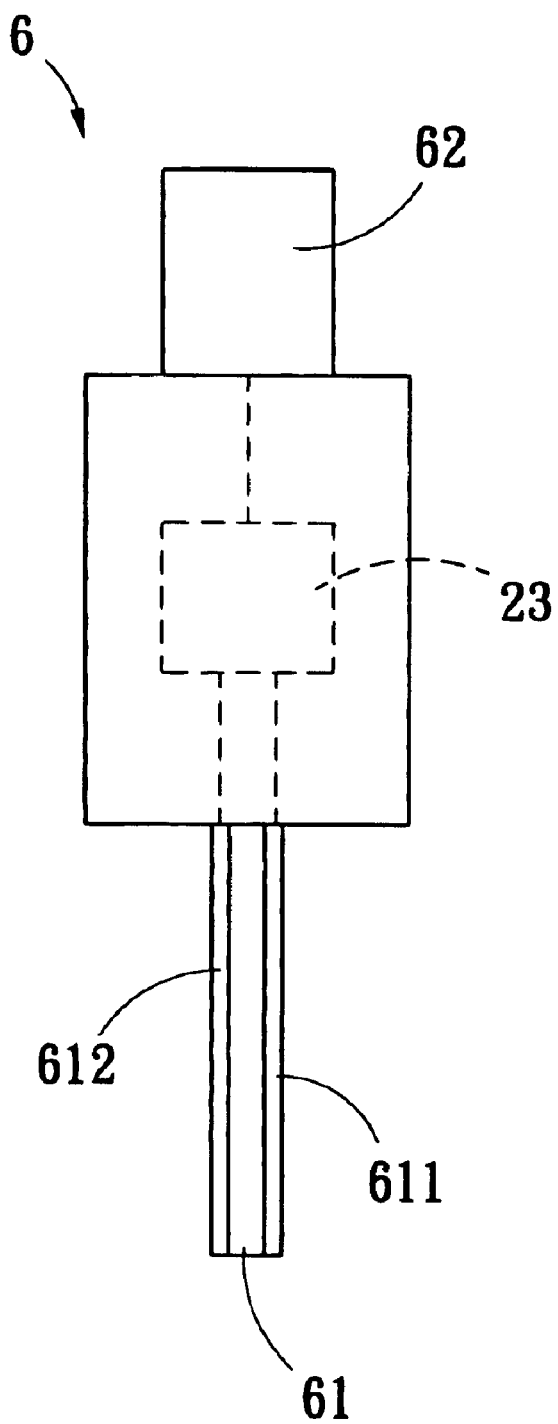
FIG. 11 is an enlarged view of the control module of FIG. 9.

Referring to FIGS. 9–11 depicting another embodiment of the power-supplying device 2 of the present invention for peripheral applied equipments of a computer, the power-supplying device 2 is comprised of a housing 21 of which one end is provided with an electrically connecting end 25 to connect a power source, the housing 21 has a plurality of power supplying jacks 26 for connecting, each of a series of sequential power supplying positions of the power supplying jacks 26 is provided with an insertion control point 261 able for disconnecting; and a control module 6 being provided therein with a control circuit 23 as the one mentioned above (as shown in FIG. 4), the control module 6 is provided on one end thereof with an insertion connecting end 61, and on the other end with a plug 62 of a universal serial bus (USB), the insertion connecting end 61 has two mutually separated connecting points 611, 612. Thereby, to place the insertion connecting end 61 of the control module 6 into one of the abovementioned insertion control points 261, the connecting points 611, 612 can break the power supplying of the power supplying jacks 26 into two parts, one part of which renders the voltage of power source of the USB port 31 to be detected to decide whether the computer 3 is turned on to thereby simultaneously turn on/off the power sources; while the other part keeps on normal electric connecting. In this way, applying of the present invention can be more convenient, and a user can make selections for insertion connecting at his will.

As an induction of the above stated, the present invention has the following advantages:

1. Power supplying of the present invention is structurally simple and easy for practicing, it not only can be used as a normal power supplying socket, but also can have the voltage of power source of the USB port be controlled to make one part thereof supply power normally, while the other part supply power under control, so that insertion connecting for power supplying can have two options, and applying of the present invention can be more convenient.
2. When the computer is turned on, the voltage of power supply sent out from the USB port of an interface of the computer is detected to control turning on/off of the peripheral applied equipments of the computer to thereby effectively avoid waste of energy and money.
3. The present invention does not need to turn off the peripheral applied equipments one by one, hence the situation that "the more the computer peripheral equipments are, the more cumbersomeness the operation of them will have" can be gotten rid of.

In conclusion, according to the above-disclosed content, the present invention can surely get the expected objects thereof to provide a power-supplying device for peripheral applied equipments of a computer. Having thus described my invention that is extremely practical, what I claim as new and desire to be secured by Letters Patent of the United States are:

What is claimed is:

1. A power-supplying device for peripheral applied equipments of a computer, said device comprises: a housing of which one end is provided with an electrically connecting end to a connect a power source, said housing has a plurality of power supplying jacks for connecting, each of a series of sequential power supplying positions of said power supplying jacks is provided with an insertion control point able for disconnecting; and a control module being provided therein with a control circuit, said control module is provided on one end thereof with an insertion connecting end, and on the other end with a plug of a universal serial bus (USB), said insertion connecting end has two mutually separated connecting points;

thereby, to place said insertion connecting end of said control module into one of said insertion control points, said connecting points break the power supplying of a corresponding one of said power supplying jacks into two parts, one part of which renders the voltage of power source of a USB port to be detected to decide whether said computer is turned on to thereby simultaneously turn on/off a plurality of power sources; while the other part keeps on normal electric connecting.

2. The power-supplying device for peripheral applied equipments of a computer as stated in claim 1, wherein said electrically connecting end is an electric wire having a plug.

3. The power-supplying device for peripheral applied equipments of a computer as stated in claim 1, wherein said electrically connecting end is an electric wire having a plug.

4. The power-supplying device for peripheral applied equipments of a computer as stated in claim 1, wherein said electrically connecting end is a plug directly formed on the rear side of said housing.

5. The power-supplying device for peripheral applied equipments of a computer as stated in claim 1, wherein said electrically connecting end is a plug directly formed on the rear side of said housing.

6. The power-supplying device for peripheral applied equipments of a computer as stated in claim 1, wherein said housing is provided therein with a universal serial bus hub, thereby, said power sources and driving connecting lines of the related ones of said peripheral applied equipments are adapted to simultaneously insertion connecting to said housing.

7. The power-supplying device for peripheral applied equipments of a computer as stated in claim 1, wherein said housing is provided therein with a universal serial bus hub, thereby, said power sources and driving connecting lines of the related ones of said peripheral equipments are adapted to simultaneously insertion connecting to said housing.

8. The power-supplying device for peripheral applied equipments of a computer as stated in claim 1, wherein said control circuit is composed of: a two-way silicon controlled rectifier (TRIAC), and a relay connecting with a gate and said jack for said universal serial bus (USB).

9. The power-supplying device for peripheral applied equipments of a computer as stated in claim 1, wherein said control circuit is composed of: a two-way silicon controlled rectifier (TRIAC), and a relay connecting with a gate and said jack for said universal serial bus (USB).

10. The power-supplying device for peripheral applied equipments of a computer as stated in claim 1, wherein said control circuit is composed of a single solid relay (SSR).

* * * * *